Figure 1:
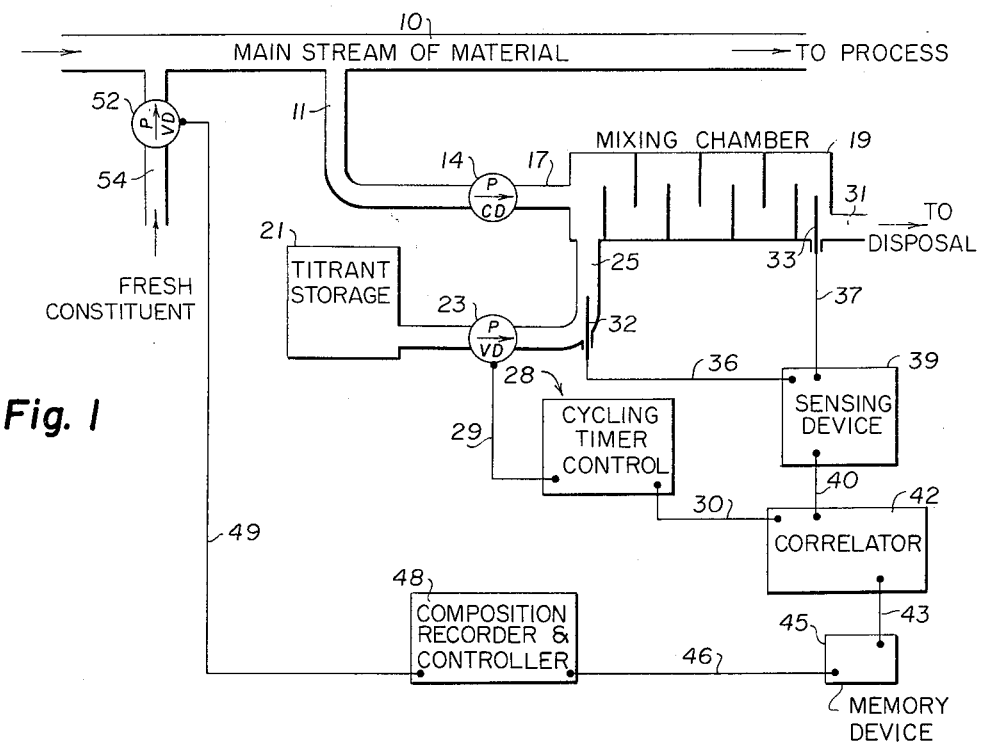

March 28, 1961  G. F. QUITTNER  2,977,199
METHOD FOR THE CONTINUOUS TESTING OF FLOWING MATERIALS
Filed Dec. 31, 1956  2 Sheets-Sheet 1

INVENTOR.
GEORGE F. QUITTNER
BY Philip J. Canepa
HIS ATTORNEY

March 28, 1961  G. F. QUITTNER  2,977,199
METHOD FOR THE CONTINUOUS TESTING OF FLOWING MATERIALS
Filed Dec. 31, 1956  2 Sheets-Sheet 2
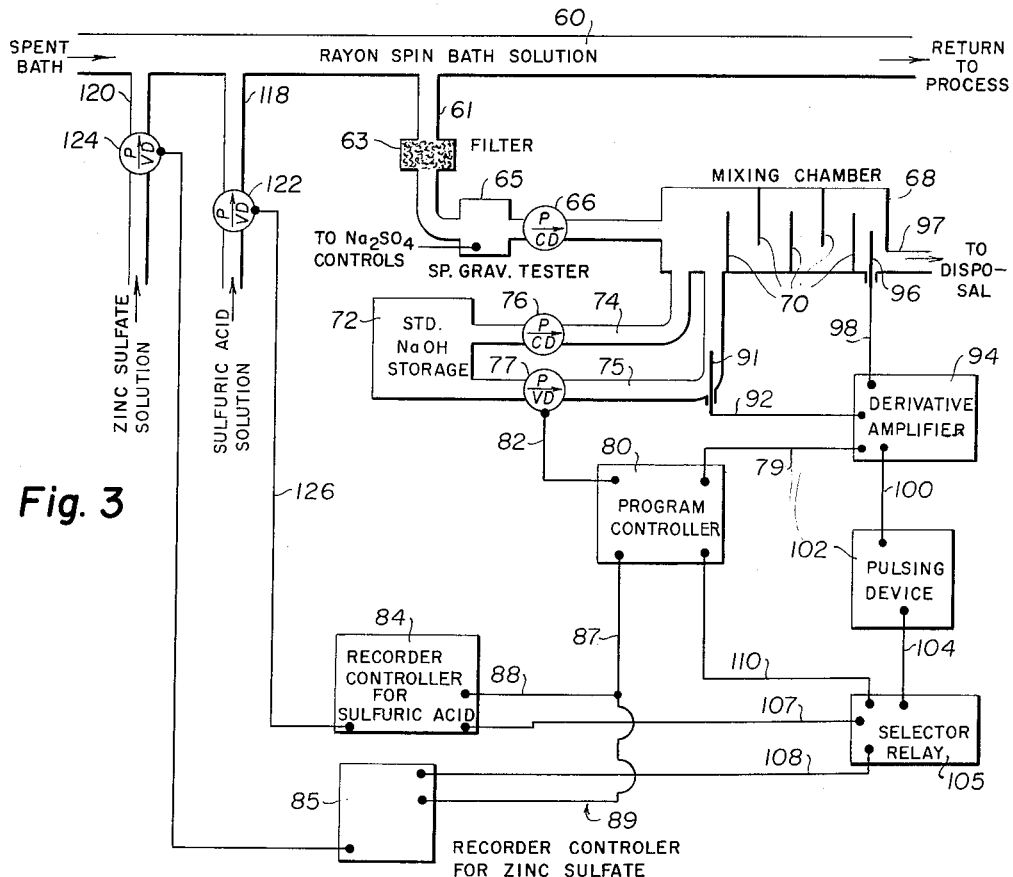
Fig. 3
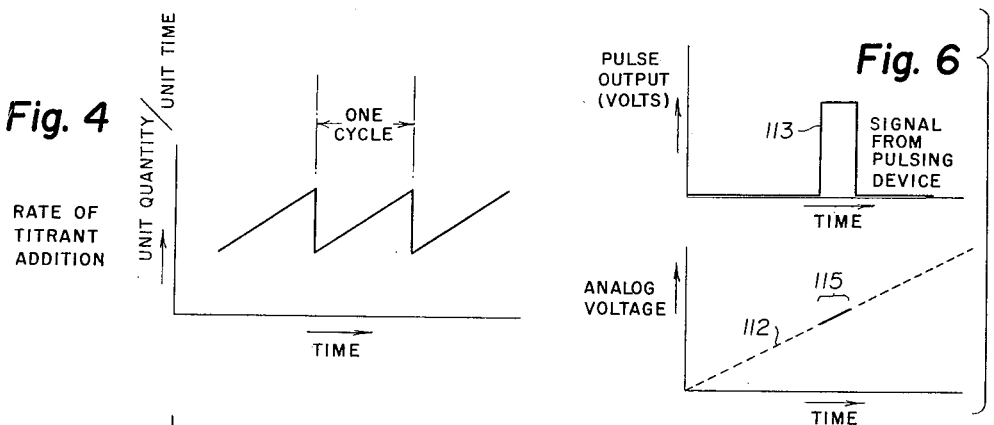
Fig. 4 — RATE OF TITRANT ADDITION
Fig. 6
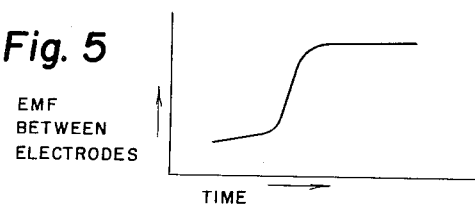
Fig. 5 — EMF BETWEEN ELECTRODES
INVENTOR.
GEORGE F. QUITTNER
BY Philip J. Canepa
HIS ATTORNEY United States Patent Office 2,977,199
Patented Mar. 28, 1961

2,977,199

METHOD FOR THE CONTINUOUS TESTING OF FLOWING MATERIALS

George F. Quittner, Cleveland Heights, Ohio, assignor to Industrial Rayon Corporation, Cleveland, Ohio, a corporation of Delaware Filed Dec. 31, 1956, Ser. No. 631,653

5 Claims. (Cl. 23—230)

This invention relates to a process for the testing of materials in a continuous manner. More particularly this invention relates to a process for the determination of the concentration of one or more constituents of a continuously flowing stream of liquid material.

In many processes it is important to accurately measure the concentration of one or more constituents of liquid solutions used or produced by the process. Measurements of this type are often necessary for such uses as, inter alia, controlling the composition of reagents used in a chemical process or controlling the treatment accorded a product or indicating and recording the composition of the final chemical product. Usually the measurement of the concentration of constituents or compositional characteristics of a substance is carried out by volumetric analysis involving the addition of a reagent of known concentration in a known quantity just sufficient to produce a stoichiometric reaction with a measured sample of the substance.

More particularly, the most widely used technique of the art of volumetric analysis is known as acidimetry and/or alkalimetry, wherein an acid or a base, as may be required, of known concentration is added to a measured aqueous sample of the substance whose composition is desired until a stoichiometric reaction or an end-point is just attained. This end-point or equivalence point is determined by either colorimetric or electrometric means well-known in the art. Knowing the concentration and volume of the added reagent and the volume of the sample, the acid or alkali content of the sample may be calculated. In the practice of volumetric analysis techniques, such as, for example, acidimetry, alkalimetry, oxidation-reduction and the like, extreme care is required that the quantity of titrant added must be just sufficient to reach the end-point or transition point since the accurate volume of titrant added is essential in obtaining the correct results from the calculations of composition. The slightest over-running or falling short in the addition of the titrant produces a serious error in the final calculated result.

In adapting these techniques to the analysis of continuously flowing streams, a small measured sample is withdrawn from the stream, titrated to an end-point by a suitable reagent, and the concentration of the constituents calculated from the results. The maintenance of accurate results using these techniques requires skilled technicians to exercise a high order of care not only in performing the titrations but also in obtaining representative samples. Even then the results obtained are only periodic measurements of the composition of the continuously flowing stream whose quantitative composition might change at any moment.

For processes which require instantaneous and continuous analyses, several methods based on standard titrimetric methods have been suggested. One such method proposes the continuous addition of a titrant to a continuously withdrawn sample stream of the material in just the correct amount to maintain the sample stream at the end-point. The end-point of the thoroughly mixed titrated sample stream is sensed and, when there is any deviation from the end-point caused by variations in the concentration of the main stream, the sensing means, usually electrometric, indicates the change and alters the titrant addition to return the sample stream to the "null" or end-point. The titrant solution may be introduced into the sample stream from an outside supply or may be formed electrolytically in situ as suggested in U.S. Patent 2,621,671. From the rate of addition of the titrant to the measured sample stream the quantitative composition of the main stream can be calculated.

Electrometric means of sensing the end-point have been found to be advantageously adapted to utilization in these continuous titrating processes. Colorimetric means, on the other hand, have not been found to be suitable as a means of detecting the end-point with the necessary accuracy and speed required by these processes. The accuracy and dependability of electrometric sensing means in these processes rely heavily upon the reproducibility of the signal produced by the electrodes. Any contamination or alteration of the surface of the electrodes caused by deposits on the electrode or suspended solids or oleagineous components of the material being tested change the characteristics of the electrode and hence the reproducibility of the results although the composition of the material tested remains the same. In order to maintain the accuracy of control systems of this type, the electrodes require constant supervision and frequent changes with attendant recalibrations to insure reproducibility. Also, systems of this type sense and control only one component of the material at a time unless multiple titrant additions are made and multiple sensing electrodes provided to determine the various components in a multicomponent material. The addition of multiple titrant introductions and electrodes interjects, in most cases, complications unwarranted for the ends to be achieved.

The present invention is directed to a process which provides a quick and accurate determination of the concentration of a number of components in a stream in a continuous manner. Sensing means other than electrometric means may be advantageously utilized in this system and the signal derived from this means need not be reproducible.

In accordance with this invention a sample stream is continuously withdrawn at a measured rate from the main stream of a material which demonstrates as the result of suitable treatment one or more transition points in a characteristic of the material that is related to the properties of the material. This sample stream is continuously treated in a series of identical cycles of treatment, each cycle consisting of varying the amount of treatment of the sample stream at an increasing or decreasing rate over a range which passes through the transition points of the characteristic of the stream. These transition points are sensed by suitable means, such as colorimetric, electrometric, and the like, and correlated with the amount of treatment performed on the sample stream. That is, the amount of treatment is measured with respect to time so that when a transition point is passed through, the amount of treatment at that instant is known and the properties being tested for can be readily ascertained.

The process of this invention may be utilized in the testing of material in many forms such as, for example, gaseous fluids, granular solids or even, in some instances, solid material which is processed in continuous strip forms, but it has been found to be particularly advantageously applied to flowing solution streams.

Material to which this process may be applied must be capable of demonstrating as the result of suitable treatment one or more transition points in a characteristic of the material that is related to the property of the material that is being tested for. Such characteristics which exhibit transition points upon treatment might be, for example, the conductivity or resistivity to an electrical current which would change upon heating of the material, the pH of a solution of the material which would be altered by the additions of a titrant, the melting or freezing of the material upon the addition or withdrawal of heat, the electrochemical potential of a solution which changes as the result of the reaction, such as a neutralization or oxidation-reduction reaction, with an added solution, and the like. Transition points in characteristics such as these might be related to various properties of the material such as; electrical conductance could be related to crystal structure of the material; pH and electrochemical potential such as mentioned above, are readily related to the concentration of the constituents of the material; and heats of fusion could be related to the structure of, for instance, organic compounds. It has been found, however, that this process is particularly advantageously utilized upon materials which exhibit transition points in their pH or electrochemical potential upon the addition of one or more titrants and thus indicate the concentration of the constituents of the material.

Figure 2:
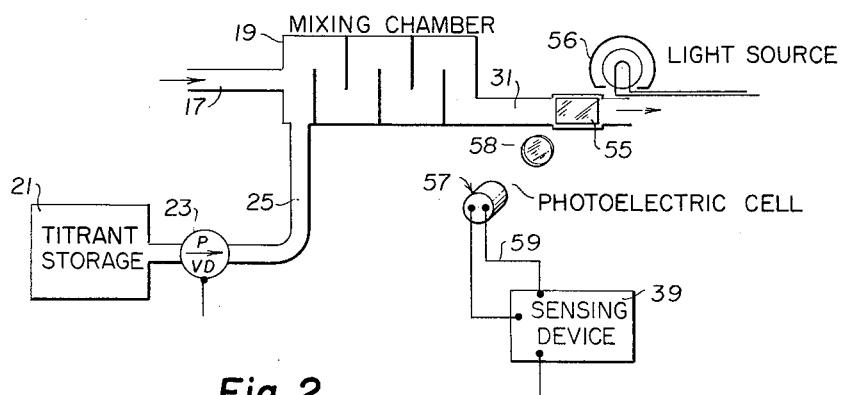

A more complete understanding of the invention and further advantages thereof will become apparent from the following detailed description and the accompanying drawings wherein like numerals are employed to designate like parts:

Figure 1 diagrammatically illustrates the essential elements of the process of this invention wherein electrometric end-point sensing means are used;

Figure 2 illustrates another embodiment of this invention wherein colorimetric-photoelectric means are utilized in sensing the end-point;

Figure 3 diagrammatically represents the application of the process of this invention to the determination of the concentration of sulfuric acid and zinc sulfate in a rayon spin bath;

Figure 4 graphically illustrates a series of identical cycles of varying treatment wherein the varying treatment consists of an increasing rate of titrant addition;

Figure 5 graphically illustrates the potential difference between the sensing electrodes during the titrations;

Figure 6 graphically illustrates the signal from the pulsing device and its relation to the analog during a single treatment cycle.

Referring to Figure 1, the invention in one form has been illustrated as applied to the determination of the quantitative composition of a single component such as, the sulfuric acid, in an aqueous sulfuric acid solution flowing through a pipe 10 by electrometric means. Although this illustration shows the determination and control of only one component of the stream, this invention is not to be so limited since a number of components may be determined by this method as will be described hereafter. From the main stream there is withdrawn continuously through pipe 11 a sample stream of the solution. The size of this stream is automatically and predeterminedly controlled by a constant delivery pump 14. The measured sample stream is then conducted by means of a conduit 17 to a small mixing chamber 19 wherein a suitable titrant, such as sodium hydroxide, is added and mixed with the sample stream.

The titrant solution is made-up in a known concentration and stored in a titrant storage vessel 21. The titrant used depends upon the material being tested and the titration reaction desired such as, for example, the determination of the amount of an acid by its neutralization with a base, the quantity of a salt by its oxidation-reduction with suitable reagents, and the like. The titrant is pumped from the storage tank 21 by means of a variable delivery pump 23 into the mixing chamber 19 through a conduit 25. The variable delivery pump 23 on the titrant conduit 25 is operated by a cycling timer control 28 by means of a signal conducting means 29. Other control means may be utilized in some applications, such as, for example, pneumatic means, hydraulic means or the like, but it has been found to be more advantageous to use electrical control and signal conducting apparatus.

The cycling timer control 28 is preset to program or control the addition of the titrant to the sample stream in a series of identical repetitive cycles through a predetermined rate of change program. Each of such cycles may advantageously increase, as is illustrated in Figure 4, at a predetermined rate with respect to time, the amount of titrant added to the sample stream from an initial rate below that necessary to produce an equivalence point with a constituent of the stream to an amount beyond the equivalence point of the constituent material. A type of cycle might also advantageously consist in decreasing the amount of titrant at a predetermined rate but the important element is that the equivalence point or end-point of the reaction between the titrant and the component tested for is passed through and not merely attained. Simultaneous with operating the variable delivery pump 23 the cycling timer control 28 sends an analog of the instantaneous amount of treatment of the sample stream by means of a conductor 30 to the correlator 42. At any time in the course of the cycle the electrical signal such as, for example, a varying voltage transmitted through the conductor 30 by the cycling timer control 28 is an analog of the degree of treatment or amount of titrant being added to the sample stream.

Located in the titrant solution conduit 25 in contact with the titrant solution is a reference electrode 32 which is electrically connected by means of a conductor 36 to a sensing device 39. Although any of the reference electrodes well-known in the art may be used such as, for example, a calomel-electrode, a quinhydrone electrode, and the like, a simple platinum wire or plate is more advantageously employed. Positioned near the exit end of the mixing chamber 19 is an indicator electrode 33 preferably of platinum-rhenium alloy or just platinum immersed in the mixed sample-titrant fluid and electrically connected by means of a conductor 37 to a sensing device 39.

As the sample stream enters the mixing chamber 19 from the conduit 17 it is mixed with the titrant being introduced from conduit 25. The combined solution is thoroughly mixed in the mixing chamber 19 before it comes into contact with the indicating electrode 33. The treated sample stream upon leaving the mixing chamber 19 by way of conduit 31 may be returned to the main stream in conduit 10 if the sample is sufficiently small in relation to the volume of the main stream not to substantially alter its composition or it may be discarded.

The sensing device 39 detects the electrometric characteristics of the sample solution as its composition is changed by means of the addition of increasing amounts of titrant from its original state through its equivalence point. Although for reasons of simplicity potentiometric titrating sensing means have been illustrated, conductometric, polarographic and other like electrometric means could also be applied in the process of this invention when this process is utilized in environments wherein they are particularly suited. In the region of the end-point or equivalence point of the reaction between the constituent of the sample stream being tested and the titrant a particularly rapid potential change is produced between the reference electrode 32 and the indicating electrode 33 which is sensed by the sensing device 39. The sensing device 39 consists, for example, of a conventional A.C. amplifier from which the time derivative of the wave is electrically taken and an impulse transmitted by means of a conductor 40 to the correlator 42 at the instant the equivalence point is reached as evidenced by the discontinuity or rapid change in the potential.

The potential change between the electrodes in many cases is sufficient to accurately detect the end-point of the reaction but it has been found advantageous for more precise detection to utilize the first derivative of the E.M.F. and particularly advantageous to utilize the second derivative of the E.M.F. to obtain a sharp end-point signal.

The correlator 42 interrlates the analog signal received from the cycling timer control 28 with the time at which the signal from the sensing device 39 is received so that the instant an end-point or equivalence point is passed through, the amount of treatment which brought about this change is known. The signal transmitted from the correlator 42 consists of the analog of the instantaneous amount of treatment sent to the correlator 42 by the cycling timer control 28 at the instant the equivalence point is passed through as indicated by the impulse from the sensing device 39.

Since this signal from the correlator 42 is transmitted only periodically at the instant specified by the sensing device 39 it is passed by means of a conductor 43 to a memory device 45 which holds it until the next end-point signal is received whereupon it is replaced with the new analog value. The memory device 45 may often easily be incorporated in the correlator 42 and may be of various types, such as, for example, if the analog from the cycling timer control 28 is a voltage, that voltage may charge a condenser during the momentary pulse from the derivative amplifier or sensing device 39. The condenser would then hold its charge until the next momentary pulse from the sensing device 39 closes a relay so that the charge on the condenser rises or falls to the new instantaneous analog value from the control 28. Advantageously the memory device 45 may be dispensed with entirely by using an instantaneous analog value averaging device with a sufficiently long time constant to serve the purpose of the memory device.

The instantaneous analog value, that is, the voltage signal corresponding to the degree of treatment at any instant, is transmitted by means of a conductor 46 and registered at a composition recorder and controller 48. The composition recorder and controller advantageously can be calibrated directly in units of quantitative composition of the constituent tested in the sample stream. The composition recorder and controller 48 by means of an electrical impulse through a conductor 49 may operate a variable delivery pump 52 on the conduit 54 feeding a fresh supply of the tested constituent into the main stream 10 thus controlling the quantitative composition of the main stream in accordance with a predetermined setting of the composition recorder and controller 48. Of course, it is readily understood that if control of the main stream is not desired but only a record of its quantitative composition, a composition recorder only may be substituted for the composition recorder and controller 48 shown.

Figure 2 illustrates the use of colorimetric-photoelectric means to sense the end-point as an alternate to the electrometric means shown in Figure 1 and described above. Colorimetric pH indicators which readily change color in accordance with the pH of their environment are standard tools of the chemical analyst. Industry utilizes many indicators which might be adapted to use in this process; it is preferred, however, that an indicator be used which has a distinct color change such as, for example, phenolphthalein which changes from colorless in an acid environment to a bright red in an alkaline environment, or Congo red which changes from a blue to a red when going from an acidic to an alkaline pH, or the like.

Referring to Figure 2, a suitable indicator selected on the basis of the reaction occurring, the color change, and the like is added to the titrant when it is made-up in the titrant storage vessel 21. As was previously described the sample stream from conduit 17 enters the mixing chamber 19 where it is thoroughly mixed with the indicator containing titrant which is introduced to the mixing chamber 19 through conduit 25 by a variable delivery pump 23. The mixed sample and titrant stream containing the indicator leaves the mixing chamber 19 through conduit 31 and is discarded. In the exit conduit 31 there is inserted a transparent section of conduit 55 which will permit light to be transmitted through the solution from a light source 56. Located on the other side of this transparent section of conduit 34 is a photoelectric cell 57 so mounted that it receives only those light rays from the light source 56 which pass through the solution. Between the photoelectric cell 57 and the solution is mounted a colored glass filter 58 adapted to absorb the light rays transmitted through the solution when the indicator has changed color indicating the end-point. That is, for example, in a process in which phenolphthalein is suitably utilized as an indicator of a change from an acid to an alkaline pH (colorless to red), a blue filter would transmit light to the photoelectric cell 57 while the indicator was colorless but when the indicator had changed to a red color upon the solution having passed through the end-point, the blue filter would absorb substantially all of the light transmitted through the red solution. The end-point would thus be sensed by a discontinuity or interruption of the light falling on the photoelectric cell 57 which would be immediately transmitted by means of an electrical conductor 59 to the sensing device 39. Upon receipt of this signal the system would operate in exactly the same manner as illustrated in Figure 1 and described above to record and/or control the compositional characteristics of the main stream of material.

Advantageously the utilization of this process in conjunction with colorimetric end-point sensing results in the rate of change rather than the amount of change being sensed as has heretofore been the commonly used method. Thus, those problems common to the presently used methods are avoided such as the gradual clouding of the transparent section of the conduit 34, variations in the indicator, signals, which are difficult to readily amplify, and the like.

Figure 3 illustrates a particular embodiment of the process of this invention wherein two constituents of the main stream of material are controlled; namely, the sulfuric acid and zinc sulfate content of rayon spin bath solution. Rayon spin bath solution normally contains, in addition to these components, water, sodium sulfate, and small amounts of various oleaginous or other organic materials. In order for this system to control the selected two constituents without being thrown off calibration, changes in the sodium sulfate content must be controlled. The concentration of the sodium sulfate may be advantageously determined and controlled by the use of commercially available automatic specific gravity equipment.

Referring to Figure 3, from the main stream of the rayon spin bath solution 60 a sample stream 61 is withdrawn, passed through a filter 63 to remove any undissolved solids, and introduced into the specific gravity tester 65. The specific gravity tester 65 automatically and continuously determines the specific gravity of the spin bath solution and actuates means (not illustrated) for controlling the sodium sulfate content of the spin bath, such as, for example, adjusting the steam flow to a spin bath evaporator, or the addition of sodium sulfate to the spin bath, or other like means. The size of the sample stream is measured and advantageously maintained constant by means of a constant delivery pump 66 which forwards the measured sample into a mixing chamber 68.

The mixing chamber 68 is provided with suitable baffles 70 to promote the thorough mixing of the titrant solution, here, sodium hydroxide, with the sample stream. The sodium hydroxide is made up in a predetermined concentration and stored in a storage vessel 72. Introduction of the sodium hydroxide to the mixing chamber 68 is made in two streams; one a constant minimum stream 74 and the other a variable cycling stream 75. A constant delivery pump 76 injects a constant amount of sodium hydroxide which is not sufficient to reach an end-point with either of the constituents being controlled. A variable delivery pump 77 pumps titrant into the mixing chamber 68 in a series of identical cycles. As an example, one of such cycles might consist of increasing the amount of sodium hydroxide introduced into the sample stream from below that necessary to reach an end-point with the constituents to an amount beyond that necessary to reach an end-point with both of the constituents being measured. By introducing a constant stream 74 of sodium hydroxide into the sample stream the length of the cycles of the variable pump 77 is reduced thus hastening the titration and increasing the degree of accuracy of the results. It is, of course, not necessary to use a minimum treatment stream since a variable delivery stream could be used which provided all of the titrant but in this case it has been found more advantageous to relieve the cycling pump from this burden.

The identical cycles of varying treatment carried out by the variable delivery pump 77 are predetermined and programmed by means of a program controller 80 which regulates the pump 77 by means of an electrical signal transmitted through a conductor 82. Simultaneous with the regulation of the variable delivery pump 77 the program controller 80 sends an analog of the instantaneous amount of predetermined treatment of the sample stream to both a recorder controller for sulfuric acid 84 by means of conductors 87 and 88 and to a recorder controller for zinc sulfate 85 by means of conductors 87 and 89. At any time in the course of a cycle, the electrical signal such as, for example, a varying voltage, transmitted to the controllers 84 and 85 by the program controller 80 is an analog of the instantaneous degree of treatment or amount of sodium hydroxide being added over and above the minimum treatment constantly performed on the sample stream.

Located in the sodium hydroxide solution stream 75 in contact with the sodium hydroxide is a platinum reference electrode 91 which is electrically connected by means of a conductor 92 to a derivative amplifier 94 such as a modified commercially available Sargent-Malmstadt Automatic Titrator control unit. A platinum-rhenium indicator electrode 96 is located near the exit conduit 97 of the mixing chamber 68 so that the thoroughly mixed titrated spin bath sample must come in contact with it as it is being discharged from the mixing chamber. This indicating electrode is also electrically connected to the derivative amplifier 94 by means of an electrical conductor 98.

When the sample stream of spin bath enters the mixing chamber 68 sodium hydroxide is added and the mixture thoroughly mixed as it proceeds through the chamber. The titrated solution leaves the mixing chamber 68 through conduit 97 and may be returned to the main stream, or preferably, here, discarded. During the course of a single cycle of treatment of this sample stream the amount of sodium hydroxide added by means of the variable delivery pump 77 is increased at a programmed rate preset in the program controller 80 from an initial rate below that necessary to reach an end-point with either the sulfuric acid or zinc sulfate to a terminal rate greater than the stoichiometric equivalent of the constituent concentration determined.

By reason of the difference in the solution surrounding the indicator electrode from that surrounding the reference electrode, an electrical potential is established between the electrodes and is sensed at the derivative amplifier 94. As the degree of titration proceeds, this potential difference changes at a very slow rate until the reaction reaches an end-point (either the neutralization of the sulfuric acid or the zinc sulfate) at which time there is a rapid change in the potential difference between the electrodes such as is shown graphically in Figure 5. The derivative amplifier takes the time derivative of the electrical wave and, at the instant of each end-point when there occurs an inflection point in the wave, it closes a switch such as, for example, a thyratron incorporated within the derivative amplifier. The thyratron in turn passes along a signal by means of conductor 100 to the pulsing device 102 which converts the signal into a pulse of predetermined length by means of a mechanical timer, electronic timer or the like. This pulse is immediately transmitted to a selector relay 105 by means of a conductor 104. The thyratron in the derivature amplifier 94 would continue to emit a signal unless its continuity was interrupted and readied for "firing" again when another inflection point occurs at the next end-point. This is accomplished by means of a timed signal from the program controller 80 transmitted to the derivative amplifier 94 by means of a conductor 79.

The selector relay 105 directs the impulse from the pulsing device 102 to either the recorder-controller for sulfuric acid 84 by means of the conductor 107 or to the recorder-controller for zinc sulfate 85 by means of the conductor 108. The program controller 80 by means of a conductor 110 actuates the selector relay 105 so that the analog signal is transmitted to the appropriate recorder controller in accordance with the time relationship of the pulse to the cycle of treatment. That is the equivalence or end-point of the lower concentration constituent would be attained first when an increasing cycle is utilized such that as here in the analyzing of rayon spin bath wherein the concentration of the sulfuric acid ranges, for example, between 5 and 9% and the concentration of the zinc sulfate ranges, for example, between 9% and 15%, the pulse denoting the end-point between the titrant and the sulfuric acid would be the first pulse during the cycle to be transmitted through the relay to the recorder controller. In order that there will be no confusion as to which end-point or equivalence point is first attained, there must be a differential in the amount of titrant necessary to reach an equivalence point with the various constituents. The differential required for effective sensing of the equivalence points depends upon the concentration of the titrant used, the rate of change in the amount of the titrant added, and the like depending upon the system being tested. Advantageously the slightest differential is all that is required so that upon the proper selection of titrant concentration, rate of change in the amount of titrant added and the like this process may be readily utilized.

The pulse transmitted by the selector relay from the pulsing device to the appropriate recorder-controller is shown graphically in the upper illustration of Figure 6. This pulse actuates an enabling device in the recorder-controller to which it is directed closing a switch momentarily during the period of the pulse enabling the recorder-controller to receive the instantaneous analog signal from the program controller 80 which represents the amount of titrant added at the end-point. This action is graphically shown in the lower illustration of Figure 6 wherein the analog corresponding to the degree of treatment is plotted against the time of treatment. The analog increases at a predetermined rate during the period of the cycle as indicated by the dotted line 112 and during the period of the pulse 113 from the selector relay 105 the recorder-controller is enabled to receive the analog shown by the solid line 115 and is actuated by it to record the composition of the sample stream.

Referring again to Figure 3 solutions of sulfuric acid and zinc sulfate of uniform and predetermined concentrations are added to the main stream of the rayon spin bath 60 through conduits 118 and 120 respectively. The amounts of these substituents which are added is controlled by variable delivery pumps 122 and 124 respectively, located in these conduits. The sulfuric acid recorder controller 84, by means of electrical conductor 126, controls the out-put of the variable delivery pump 122 in accordance with the relationship of a preset required concentration of sulfuric acid in the main stream 60 to the actual determined concentration of sulfuric acid. The zinc sulfate recorder controller 85 carries out a like function with the variable delivery pump 124 on the zinc sulfate addition. Thus the concentration of the sulfuric acid and the zinc sulfate in the spin bath is determined, recorded, and controlled in a continuous manner, easily, and with a high degree of accuracy.

As previously mentioned, the process of this invention is not limited to the determination of only one constituent but may be advantageously applied to the analysis of multiple component systems wherein two or more components are determined as illustrated in Figure 3 above. Also, this process may be advantageously adapted to multiple component systems in which the analyzed components are not titratable by a single titrant. Where two or more titrants are used, this process may be adapted to consist of two or more different consecutive cycles involving the use of the different titrants and during which the separate end-points are realized.

Also it is readily understood that the titrant solution need not be the material cycled in all applications of this process. The titrant addition may just as readily be maintained constant while the size of the sample withdrawn is varied. Nor need one of the streams necessarily be maintained absolutely constant since what is required in determining the concentration of the constituent is the size of the sample stream, the concentration of the titrant and the rate of addition of the titrant at the time the end-point is reached. The variation of the rate of addition of the cycled material need not be constant or linear as has been illustrated above but may be any varying rate of change such as a logarithmic rate of change or the like so long as it is known and reproducible for each cycle.

It should be understood that while Figure 3 in the above description constitutes a practical and immediate embodiment of this invention, the process illustrated in Figure 1 and described in connection therewith may be advantageously applied to many kinds of testing and many types of material. The stream of material although illustrated above as a liquid stream, may advantageously be a gaseous stream or a stream of discrete solid particles or, in some instances, a strip of solid material being processed in a continuous manner. Any material capable of undergoing treatment resulting in its passing through one or more easily sensed transition points or sudden changes in its physical, chemical or electrical properties or characteristics which are related to the property of the material being determined such as its tenacity, hardness, resistance to flexing, color, pH, ferromagnetic properties, electrical resistance, light transmission, refractive index, infra-red absorption pattern or the like is susceptible to testing by this process. One of such applications of this process may be illustrated by a system for the control of a passing strip of material ferromagnetic at normal temperatures but not so when above the Curie temperature wherein sensing elements capable of sensing the discontinuity or transition point, that is, the presence or absence of ferromagnetic properties are utilized. In this adaptation the programmed treatment cycles would consist of temperature variations and the recorder controller would record and, if desired, control a manufacturing characteristic to maintain the Curie temperature constant. Somewhat similar embodiments might have sensing elements capable of sensing the resistance to flexing, or resistance to abrasion, or the presence of flows in a coating, or of surface discolorations as the temperature of the passing sample is cycled.

Since certain changes in the practice of this invention may be readily made without substantially departing from its spirit or scope, it is to be understood that all the foregoing be interpreted as being merely illustrative and is not to be construed as limiting or restricting the invention as particularly pointed out and defined in the appended claims.

What is claimed is:

1. A process for automatically and continuously determining the properties of a flowing material comprising; continuously withdrawing and measuring a sample stream from the main stream of material, said material being capable of demonstrating as a result of treatment at least one transition point evidenced by a sudden increase in the rate of change in the characteristics of the material related to the properties of the material; treating said sample stream in a continuous series of identical cycles through said transition points; said treating cycles consisting of varying at a predetermined rate the amount of treatment per unit time accorded said sample stream; sensing said transition points to obtain an instantaneous signal at the increased rate of change occurring as each transition point is passed through; transmitting to a property indicating means an analogue signal of the amount of treatment being accorded said sample stream; transmitting said instantaneous signal to said property indicating means to enable said indicating means to receive said analogue signal and to indicate the properties of said flowing stream of material.

2. A process for automatically and continuously determining the concentration of the constituents of a flowing stream of material comprising; continuously withdrawing and measuring a sample stream from the main stream of material, said material being capable of demonstrating as a result of treatment at least one transition point evidenced by a sudden increase in the rate of change in the characteristics of the material related to the concentration of the constituents of the material; treating said sample sream in a continuous series of identical treatment cycles through said transition points; said treatment cycles consisting of varying at a predetermined rate the amount of treatment per unit time accorded said sample stream; sensing said transition points to obtain an instantaneous signal at the increased rate of change occurring as each transition point is passed through; transmitting to a composition indicating means an analogue signal of the amount of treatment being accorded said sample stream; transmitting said instantaneous signal to said composition indicating means to enable said indicating means to receive said analogue signal and to indicate the concentrations of the constituents of said flowing stream of material.

3. A process for automatically and continuously determining the concentration of the constituents of a flowing solution stream comprising; continuously withdrawing and measuring a sample stream from the main solution stream, said solution being capable of demonstrating as a result of titration at least one transition point evidenced by a sudden increase in the rate of change in the electromotive force developed between sensing electrodes that is related to the concentration of the constituents of the solution; titrating said sample stream in a continuous series of identical titration cycles through said transition points; said titration cycles consisting of varying at a predetermined rate the amount of titrant added per unit time to said sample stream; sensing said transition points by introducing a reference electrode into the titrant and an indicator electrode into the titrated sample stream and differentiating the electromotive force between said electrodes to obtain an instantaneous signal at the increased rate of change occurring as each transition point is passed through; transmitting to a composition indicating means an analogue signal of the amount of titrant being added to said sample stream; transmitting said instantaneous signal to said composition indicating means to enable said indicating means to receive said analogue signal and to indicate the concentration of the constituents of said flowing solution stream.

4. A process for automatically and continuously determining the properties of a flowing material comprising; continuously withdrawing and measuring a sample stream from the main stream of material, said material being capable of demonstrating as a result of treatment at least two transition points evidenced by a sudden increase in the rate of change in the characteristics of the material related to the properties of the material; treating said sample stream in a continuous series of identical cycles through said transition points; said treating cycles consisting of varying at a predetermined rate the amount of treatment per unit time accorded said sample stream; sensing said transition points to obtain an instantaneous signal at the increased rate of change occurring as each transition point is passed through; transmitting to a property indicating means an analogue signal of the amount of treatment being accorded said sample stream; transmitting said instantaneous signal to said property indicating means to enable said indicating means to receive said analogue signal and to indicate the properties of said flowing stream of material.

5. A process for automatically and continuously determining the concentration of sulfuric acid and zinc sulfate in a flowing stream of rayon spin bath comprising; continuously withdrawing and measuring a sample stream from the main stream of rayon spin bath, titrating said sample stream with aqueous sodium hydroxide in a continuous series of identical titration cycles through the transition points of said sulfuric acid and zinc sulfate evidenced by a sudden increase in the rate of change in the electromotive force developed between sensing electrodes; said titration cycles consisting of increasing at a predetermined rate the amount of sodium hydroxide per unit time added to said sample stream; electrometrically sensing said transition points by introducing a reference electrode into the titrant and an indicator electrode into the titrated sample stream and differentiating the electromotive force between said electrodes to obtain an instantaneous electrical pulse at the increased rate of change occurring as each transition point is passed through; transmitting to a composition indicating means an analogue signal of the amount of sodium hydroxide being added to the sample stream; transmitting said instantaneous electrical pulse to said composition indicating means to enable said composition indicating means to receive said analogue signal and indicate the concentration of sulfuric acid and zinc sulfate in the flowing stream of rayon spin bath.

References Cited in the file of this patent

UNITED STATES PATENTS

| | | |
|---|---|---|
| 2,607,718 | Suthard | Aug. 19, 1952 |
| 2,666,691 | Robinson | Jan. 19, 1954 |
| 2,668,097 | Hallikainen | Feb. 4, 1954 |
| 2,672,405 | Sheen | Mar. 16, 1954 |
| 2,705,183 | James | Mar. 29, 1955 |
| 2,726,936 | Bernheim | Dec. 13, 1955 |
| 2,878,106 | Malmstadt | Mar. 17, 1959 |

OTHER REFERENCES

Richter Anal. Chem., vol. 27, October 1955, pages 1526 to 1531.